United States Patent [19]
Johnson et al.

[11] Patent Number: 4,961,278
[45] Date of Patent: Oct. 9, 1990

[54] DAY/NIGHT TELESCOPIC SIGHT

[75] Inventors: Charles B. Johnson, Ft. Wayne, Ind.; Richard E. Blank, Roanoke, Va.

[73] Assignee: ITT Corporation, New York, N.Y.

[21] Appl. No.: 326,495

[22] Filed: Mar. 17, 1989

Related U.S. Application Data

[63] Continuation of Ser. No. 99,925, Sep. 23, 1987, abandoned.

[51] Int. Cl.⁵ ............................ F41G 1/36; F41G 1/38
[52] U.S. Cl. ........................................ 42/101; 42/103; 350/538; 350/12; 250/213 VT; 33/245
[58] Field of Search ............ 42/103, 107; 350/538, 350/1.2; 33/245–250; 356/247; 250/213 VT, 330

[56] References Cited

U.S. PATENT DOCUMENTS

| | | | |
|---|---|---|---|
| 2,946,255 | 7/1960 | Bolay | 350/1.2 |
| 3,407,302 | 10/1968 | Bouwers | 350/538 |
| 3,464,757 | 9/1969 | Schmidt | 350/538 |
| 3,509,344 | 4/1970 | Bouwers | 350/538 |
| 3,529,882 | 9/1970 | Schmidt | 350/538 |
| 3,712,702 | 1/1973 | Schmidt | 350/538 |
| 4,000,419 | 12/1976 | Crost et al. | 350/538 |
| 4,440,476 | 4/1984 | Jacobson | 250/213 VT |
| 4,582,400 | 4/1986 | Lough | 350/538 |
| 4,776,126 | 10/1988 | Williams | 42/101 |

FOREIGN PATENT DOCUMENTS 1102014 3/1961 Fed. Rep. of Germany ...... 350/538

Primary Examiner—Charles T. Jordan
Assistant Examiner—Michael J. Carone
Attorney, Agent, or Firm—Thomas N. Twomey

[57] ABSTRACT

A telescopic sight assembly has formed therewith a rotatable or adjustable housing which housing includes an image intensifier tube and suitable optics to be used in conjunction with a conventional telescopic assembly. By means of a simple action associated with the telescopic sight, a user can rotate a control knob or lever and, hence, change operation of the sight for day to nighttime use, or vice versa. Included in the assembly is a conventional image intensifier module and the necessary electronics to operate the module. The housing is rotatable or pivotable and includes means which can be selected by the user to select night or daytime operation and, hence, afford the user telescopic viewing together with image intensification as desired. The device is particularly adaptable to be mounted in conjunction with small arms type systems.

6 Claims, 3 Drawing Sheets

DAY/NIGHT TELESCOPIC SIGHT

The Government has rights in this invention pursuant to Contract No. DAAK10-84C-0246 awarded by the Department of the Army.

This application is a continuation of application Ser. No. 099,925, filed Sept. 23, 1987, now abandoned.

RELATED APPLICATIONS

A copending application entitled "Small Arm Sight For Use During Daylight And Nighttime Conditions", Ser. No. 099,926, filed on Sept. 23, 1987 for Pat. No. 4822994 for C.B. Johnson and Francis J. Augustine is assigned to the assignee herein.

BACKGROUND OF INVENTION

This invention relates to gun sights in general and more particularly to a gun sight which can be employed for either nighttime or daytime operation and which is particularly adaptable for small arms, such as rifles, shotguns, pistols and so on.

In regard to the above-noted related application and as one can ascertain, the prior art is replete with various devices generally designated as sights In general a sight is utilized for aiming a gun at a directly visible target. In order to aim a gun some sort of sighting device is required. Such devices range from simple front and rear sights, like those on an ordinary rifle, to complex fire control systems for large guns. The copending application has an extensive background of invention which describes many of such sighting devices. In any event, as one can ascertain, there is a need in modern weapons systems to provide sights which can be employed for night or daytime use. In the above-cited application there is described a sight which utilizes an image intensifier which can be directly positioned or removed from a telescopic sight assembly and as such is a separate component which can either be incorporated into the sight for nighttime use or can be removed from the sight assembly for daytime use.

The most common telescopic sights for use on weapons consists of an optical system made of lenses. This is a form of a refracting telescope which is useful under conditions of high illumination as, for example, daytime conditions. There exists telescopic sights in which an image intensifier has been included so that the sighting can be implemented using low levels of illumination. Such sights have been referred to in the above-noted copending application. In any event, the function of an image intensifier is to multiply the amount of incidental light received by it to produce a greater signal for application to the eyes of a viewer. As such, these devices have been employed by the military and in commercial devices as well. Examples of such devices can be had by reference to a text entitled "Photo Electricity And Its Applications" published in 1949 by John Wiley and Sons. Chapter 18 entitled "Light Beam Signaling Infrared Detection" shows examples of early nighttime vision devices which may be employed as gun sights, such as the Sniperscope and Snooperscope. In any event, in a modern weapon for military, policy or general use, such a weapon should employ a sight which will allow the weapon to be used during the day or night. The present system utilizes a sight which is capable of both day and nighttime operation and which is contained in a single compact structure so that it is not necessary to carry additional parts. Thus, the present invention is concerned with a one-piece day/night telescopic sight which can be used on shotguns, rifles, cross-bows and pistols. The telescopic sight device employs a simple pivotable or rotatable action implemented with a control knob or lever which enables one to operate the device in either a day or a nighttime setting under the selective actuation of the control knob or lever.

SUMMARY OF THE INVENTION

A sight apparatus for use in conjunction with a firearm to enable a user to selectively implement day or night operation, comprising a telescopic sight assembly means having a pivotable housing section located between the ocular and objective of said telescopic sight assembly, said housing containing an image intensifier means for night time use, and means coupled to said housing for pivoting said housing between a first and a second position indicative of a day and a nighttime mode, whereby when operated in said second position said image intensifier means is aligned with the optical axis of said telescope to provide nighttime operation and where in said first position said image intensifier means is removed from said optical axis to provide daytime operation.

BRIEF DESCRIPTIONS OF FIGURES

DETAILED DESCRIPTION OF INVENTION

Figure 1:
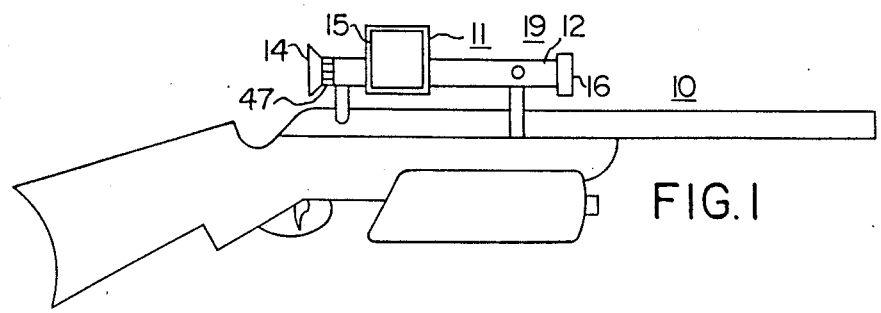
FIG. 1 is a side plan view showing a small arms weapon, such as a shotgun, employing a sight assembly according to this invention.

Referring to FIG. 1 there is generally designated, by reference numeral 10, a small firearm. The firearm may be a shotgun, for example, of the type manufactured by a company called Crane and designated as the F2-1078. Such shotguns are widely available from many manufacturers. While FIG. 1 portrays a shotgun, it is immediately understood that the present invention can be employed on various other types of small weapons, such as rifles, cross-bows, pistols and so on.

As seen in FIG. 1, there is mounted to the barrel of the shotgun a telescopic assembly 19 according to this invention. Essentially, the telescopic assembly 19 includes an eyepiece 14 for the user to view through and is associated with a housing 11 which contains an image intensifier tube and associated circuitry, as will be explained. Coupled to the housing 11 is a lever mechanism 15 or an actuating mechanism to enable the user of the gun 10 to employ the gun either for a daytime or nighttime operation. This is accomplished by the simple movement of the lever 15. Shown also coupled to the housing section 11 is a tube 12 which essentially forms part of the telescopic assembly and may be associated with suitable controls such as 16 for controlling focusing, magnification. Such structures are well-known mechanical components associated with telescopic sights in general.

As one can ascertain, most telescopic sights, as indicated above, include a refracting type of telescope. As is known, all refracting telescopes comprise an objective lens, which is directed towards the object to be observed, and an ocular lens, or an eyepiece, to which the observer applies his eye. The rays coming from a distant object are almost parallel and are converged to form an image at the focus of the objective. Telescopes are well known and such devices are widely employed for use with gun sights. Hence, as seen in FIG. 1, the eyepiece 14 would contain the ocular lens while the end piece, or front section 12, would contain the necessary lenses to form the objective. The entire gun sight may also operate with conventional zoom assemblies such as 47 and so on, all of which are known in the art. Such sights may also include windage and elevation controls which are also conventional.

In any event, it is the housing section or portion 11 which will be described in greater detail and which will enable a user to automatically change operation from nighttime to daylight use, or vice versa, by the simple actuation of the lever or actuating mechanism 15 associated with the housing 11.

Figure 2:
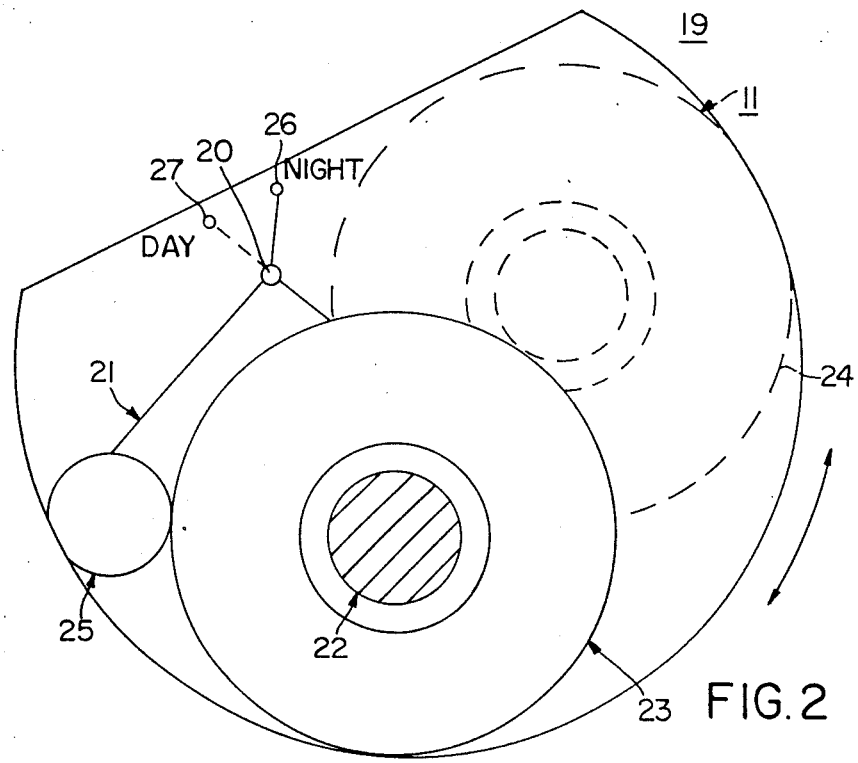
FIG. 2 is a front plan view showing a rotatable housing assembly utilized in this invention.

Referring to FIG. 2 there is shown a front view of a typical housing assembly 19. Associated with the housing assembly, which may take the configuration as shown in FIG. 2, is a pivot point 20. The pivot point 20 may be a rod or other suitable mechanism which will allow the housing to pivot or rotate. Essentially, as seen in FIG. 2, there is shown a first and a second position designated by numerals 26 and 27 and respectively indicated as night and day. By the rotation of the housing section 11 between the night and day positions, one will therefore obtain image intensification during one operating condition or no intensification during another operating condition. This is accomplished by movement of the lever 15 which essentially moves the housing and hence element 23 to the dashed line position designated by reference numeral 24. In order to fully understand the operation of the device, reference is again made to FIG. 2 wherein each of the components or assemblies associated with the figure will be be described in great detail.

The pivot point 20 may comprise a rod or other suitable mechanical coupling arrangement, such as a gear and train, cam, turret and so on, which enables the entire section 11 to move so that the assembly 23 moves out of the optical axis of the telescopic for daytime use. As seen in FIG. 2, the housing section 11 is basically shown in a front plan view. Essentially the housing section 11, which is part and parcel of the gun sight, includes an 18mm active diameter image intensifier assembly 23. Such assemblies are well known in the art and, for example, are designated as microchannel devices and are available from IT&T of Roanoke, Va., as commercially available units. Such assemblies come with wraparound high voltage power supplies which power supplies are used as a bias source for the intensifier. The area 22 associated with intensifier assembly 23 is the active image area. This active image area is placed between the ocular and objective lens of the telescope along the optical axis as is shown in the position of FIG. 2 for nighttime operation. The dashed representation of the assembly 23 is shown in 24 and is in position for daytime use. Also shown, coupled to the housing section 11, is an optical or lens coupling assembly 25. The lens coupling assembly 25 is placed in the optical path of the telescope when the lever 15 is operated for daytime use. The assembly 25 may consist of a conventional lens coupler or a fiber optic coupler which will enable one to utilize the telescope assembly strictly with the ocular and objective lens associated with the telescopic gun sight 19 for daytime use. The housing further includes a circuitry module 21 which includes circuitry for coupling to the image intensifier tube 23. Such circuitry may include a gain control for varying intensification gain during nighttime use and so on.

As one can see from the diagram of FIG. 2, the housing section 11, which is associated with the image intensifier module 23, can be rotated or turned by means of conventional mechanical coupling schemes so that it is operative either in the day or nighttime position. In the nighttime position the active area 22 associated with the image intensifier module 23 is positioned between the ocular and objective lens to provide light intensification as is known in the art. In daytime operation the turret again is moved in the daytime position so that the lens coupler 25 is now directly in the path of the gun sight to enable operation for daytime use.

As can be ascertained, suitable intensifier tubes which can be employed for use in this invention are commercially available and see, for example, U.S. Pat. No. 4,202,601 entitled "Training Aid For Use With Nighttime Vision Apparatus" which issued on May 13, 1980 to J. H. Burbo et al. and assigned to the assignee herein. In that particular patent there is given many examples of image intensifier devices which can be employed in conjunction with this invention. Such devices may contain a microchannel plate (MCP) which consists of a thin glass plate with an array of microscopic holes therethrough. Each hole is capable of acting as a channel-type secondary emission electron multiplier. The plate, when positioned in the plane of the electron image in an intensifier tube, makes it possible to achieve extremely high gains during nighttime operation.

The tube employed can be considered to be an array of photomultipliers and as such is a vacuum tube equivalent of semiconductor large scale integration. For examples of other types of image intensifier devices, reference is also made to a text entitled "Reference Data For Radio Engineers" (ITT Handbook), published by Howard W. Sams & Company, Inc., a subsidiary of International Telephone and Telegraph Corporation, the assignee herein. In regard to that textbook see, for example, pages 17-37 et seq. entitled "Light Sensing Tubes".

The above-noted patent is cited to give examples of intensifier modules which are constructed and employed as part and parcel of a night vision goggle system. These intensifier tubes, or modules, are available with wraparound power supplies to conserve space and, hence, are implemented in relatively small diameters, such as 18mm. As can be seen from FIG. 2, the particular housing is generally of a semicircular configuration and is completely compatible with ordinary optics.

Figure 3:
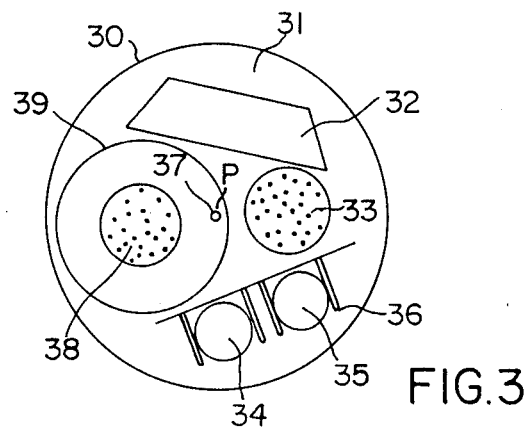
FIG. 3 is a front plan view showing an additional embodiment according to this invention.

Referring to FIG. 3 there is still shown a more detailed and an alternate embodiment of a housing section 30 (11 of FIG. 1) associated with the telescopic sight. Referring to FIG. 3 there is shown a circular housing assembly which, again, is rotatable between a night and a daytime position. It is noted at this point that there are virtually a plurality of ways of rotating any assembly in a reliable and consistent manner, including all sorts of mechanical means which can be rotated by means of a lever, by means of a hand motion, including detent operation, so that one can feel when a turret assembly, such as assembly or housing 30, has been rotated from a first position indicative of a daytime position to a second position indicative of nighttime operation. The housing section 11 is only shown in front plan view for clarity.

In any event, the housing 11 is a longitudinal cylinder having a hollow for accommodating the described components and is rotatable as described.

Referring to FIG. 3 reference numeral 30 depicts the front of a cylindrical housing having a central pivot point 37 which pivot point may be implemented by many means, such as a center rod or a rod coupled to a gear assembly for rotating between a night and a daytime position. Reference numeral 31 refers to a potting compound which potting compound can be employed to gain further rigidity between the various components mounted in the hollow of housing 30. Also shown within the housing is a high voltage power supply 32. Power supplies for image intensifier modules are well known in the art and essentially such supplies are operated by means of a conventional battery, such as batteries 34 and 35, which are retained in a suitable battery clip 36. The batteries are mounted on the housing 30 for easy removal. In any event, such high power supplies as associated, for example, with image intensifier tubes or devices, may comprise a transistor arrangement consisting of an oscillator configuration having the oscillator output coupled to a primary winding of a transformer. The secondary winding of the transformer has a larger number of turns and is associated with a typical voltage diode multiplier array to obtain high voltage at a relatively low current which is used to bias the image intensifier tube. Such techniques and circuits are well known in the prior art and are available, as indicated, as commercial devices from many sources.

Also shown in the figure is a module 33, which is a fiber optic lens transfer element, or lens coupler, utilized during the daytime position. Reference numeral 39 depicts the outer diameter of a typical image intensifier tube or module which are available, for example, from IT&T Optical Systems of Roanoke, Virginia. Such devices are available for large amplification by the use of typical image intensifier techniques having outer diameters of approximately 35.5mm. The active area is designated by numeral 38 and essentially is the active area of the face plate associated with such intensifier devices. It should be immediately apparent, as seen from FIG. 3, that based on the central pivot point 37 one can now rotate the entire housing 30 to a position whereby the image intensifier active area 38 will be in direct line with the optical axis of the telescopic sight for nighttime use or, upon an opposite rotation, the element 33 will be in direct line with the optical axis of the telescopic sight for daytime use.

A typical device, as shown in FIG. 3, and as constructed has an overall diameter of approximately 72mm. Thus, as one can ascertain, the entire mechanism is extremely small and can be implemented and carried conveniently on a firearm, such as the firearm 10 shown in FIG. 1.

Thus, as one can ascertain from FIG. 3, the intensifier, the transfer assembly and the power supply are mounted close together and are potted for additional strength. The batteries, such as batteries 35 and 34, are readily accessible as they must be changed at prespecified intervals, depending on usage. As is seen, the assembly or housing 30 rotates about pivotal point 37 such that 180° rotation implements a change from day to night operation and vice versa. A power supply switch can be operated by the rotation or externally or both. Essentially, the power supply would be contained in module 30. The power supply may be energized by a suitable on/off switch, such as, for example, the switch 16 shown in FIG. 1, or may automatically be implemented when the turret is rotated from a nighttime to a daytime condition. Such techniques, as well as switches performing such operation upon a selective rotation of a turret assembly by a user, are well known in the art and many examples of commercially available devices are easily understood by those skilled in the art.

Figure 4:
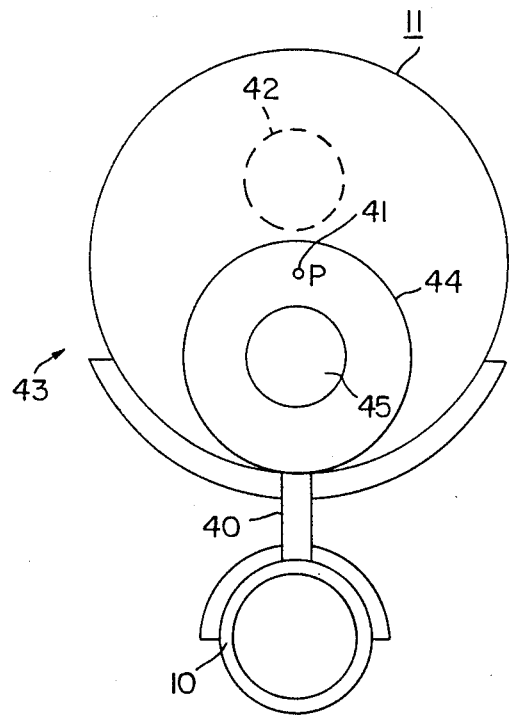
FIG. 4 is a front plan view showing still another aspect of the present invention.

Referring to FIG. 4 there is shown an end view of a barrel of a gun 10 having mounted on the barrel, by conventional means, a typical telescopic mount 40. Such telescopic mounts or brackets 40 for coupling a telescopic sight assembly to any conventional barrel are well known in the art and, again, numerous examples of such devices exist. In any event, as one can see from FIG. 4, there is shown the housing section 11 associated with the telescopic sight. There is shown element 42 which again is a fiber optic or lens transfer element utilized in conjunction with the ocular and objective lens of the gun for daytime use. The pivot point 41 is shown and is the axis of rotation for the housing 11. Reference numeral 43 refers to the optical axis of the telescopic sight. Reference numeral 45 refers to the active area of the image intensifier module which, again in FIG. 4, is shown in the night position. The reference numeral 44 essentially shows the remaining portions of the typical scope, such as, for example, the tubular section 12 as shown in FIG. 1.

Figure 5:
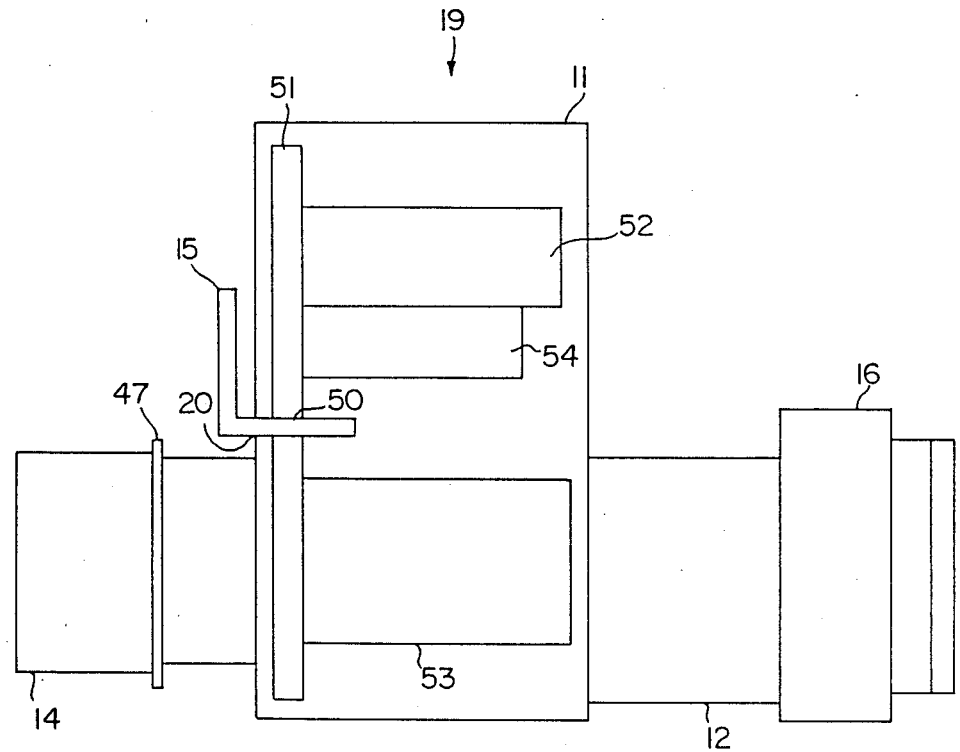
FIG. 5 is a partly sectional view of the sight assembly of this invention.

FIG. 5 is a partly sectional view of a third embodiment of the telescopic assembly 19 taken along its longitudinal axis. The eyepiece 14 lies adjacent the zoom assembly 47 at one end of the assembly 19, and the tube 12 is associated with the focusing and magnification controls 16 at the opposite end. In this embodiment, the housing 11 includes a plate 51 on which an image intensifier tube 52 for nighttime use and a module 53 for daytime use are mounted. Power supply 54 for the image intensifier tube is also located in the housing 11. The pivot point 20 is shown as a rod 50, Thus, one can ascertain from FIG. 5 that the plate 51 pivots in a plane perpendicular to the rod 50, the rod 50 being parallel to the longitudinal axis of the telescopic assembly 19. The lever 15 is joined to the rod 50 and functions to rotate the rotate the elements between a nighttime and a daytime position.

In view of the above, there has been described a housing assembly included in a telescopic sight which can be manually rotated by means of a lever or any other device and which is associated with a small firearm, such as the shotgun 10 depicted in FIG. 1. Such an assembly allows a user, by a simple turn of a lever or the movement of some other mechanism, to selectively switch the sight from a daytime to a nighttime use. The entire unit, as described above, is extremely small and can be implemented in a simple and reliable manner as all components are commercially available.

As seen in FIG. 4, the end view of the shotgun and scope, including the intensifier system, is clearly depicted. The fiber optic transfer, or element 42, has an effective length equal to that of the tube or image intensifier assembly to compensate for the separation introduced by the image intensifier tube when placed in the optical path of the telescope. Other components associated with such sights can also be employed. See, for example, the above-noted copending application. These components may include elevation and windage adjustments for reasonable accuracy but, in any event, based on a shotgun or a device as depicted in FIG. 1, such devices are not deemed to be necessary.

It should be apparent to one skilled in the art that there has been described a simple gun sight which can be employed for both nighttime and daytime use and mounted on a hand-held firing arm. The sight is provided with a rotatable or switchable housing assembly structured with the scope to enable an operator to adjust the same for day or nighttime use.

What is claimed is:

1. A sight apparatus for use in conjunction with a firearm to enable a user to selectively implement a day or night operation, comprising:
    a telescopic sight assembly adapted to be mounted on a hand-held weapon, said assembly extending in the same longitudinal direction as the weapon and including
        a first section having an objective lens,
        a second section spaced from said first section and extending along the longitudinal axis of said first section, said second section including an ocular lens, and
        a housing mounted between said first and second sections, a portion of said housing extending outside of the longitudinal axis of said first and second sections;
    a plate pivotally mounted in said housing and being movable in a plane which extends perpendicular to said longitudinal axis;
    an optical assembly mounted on said plate, said assembly including
        a microchannel plate image intensifier tube for night operation,
        power supply means communicating with said image intensifier tube;
        means for activating said power supply means;
        optical means for day operation, said optical means including a fiber optic array; and
    lever means coupled to said plate and extending outside of said portion of said housing for pivoting said plate between a first position in which said image intensifier tube is aligned with the longitudinal and optical axes of said telescopic sight assembly and said fiber optic array is located in said housing portion, and a second position in which said fiber optic array is aligned with the longitudinal and optical axis of said telescopic sight assembly and said image intensifier tube is located in said housing portion.

2. The sight apparatus according to claim 1 further including bracket means for coupling said telescopic sight assembly means to the barrel of said firearm.

3. The sight apparatus according to claim 1 wherein said means coupled to said housing is operative to rotate said housing 180°.

4. The sight apparatus according to claim 1 wherein said housing is circular in cross section.

5. The sight apparatus according to claim 1 wherein said telescopic sight assembly includes focussing means.

6. The sight apparatus according to claim 1 wherein said telescopic sight assembly includes a zoom lens means.

* * * * *